(12) United States Patent
Chalin et al.

(10) Patent No.: US 7,717,526 B2
(45) Date of Patent: May 18, 2010

(54) SUSPENSION SYSTEM HAVING A COMPOSITE AXLE

(75) Inventors: Thomas N. Chalin, Fairview, TX (US); Cully B. Dodd, McKinney, TX (US); Herbert D. Hudson, McKinney, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 1033 days.

(21) Appl. No.: 10/600,049

(22) Filed: Jun. 20, 2003

(65) Prior Publication Data

US 2004/0256910 A1 Dec. 23, 2004

(51) Int. Cl.
*B60B 35/00* (2006.01)
*B60G 21/05* (2006.01)

(52) U.S. Cl. .............................. 301/132; 280/124.128

(58) Field of Classification Search ............ 280/124.11, 280/124.116, 124.125, 124.128, 124.153; 301/124.1, 127, 131–132; 295/36.1, 37, 295/39
See application file for complete search history.

(56) References Cited

U.S. PATENT DOCUMENTS

| | | | | |
|---|---|---|---|---|
| 365,178 A * | 6/1887 | Gracey | ....................... | 301/132 |
| 583,195 A * | 5/1897 | Ferguson | .................... | 301/131 |
| 983,855 A * | 2/1911 | Aton | ........................... | 301/132 |
| 1,086,166 A * | 2/1914 | Hall | ............................ | 301/132 |
| 2,370,773 A * | 3/1945 | Bradley | ...................... | 301/132 |
| 3,756,646 A * | 9/1973 | Gimlett et al. | ................ | 295/43 |
| 3,895,819 A | 7/1975 | Willetts | | |
| 4,200,326 A * | 4/1980 | Wilcox | ......................... | 295/23 |
| 4,417,028 A * | 11/1983 | Azevedo | ..................... | 525/285 |
| 4,768,839 A * | 9/1988 | Spindler | .................. | 301/124.1 |
| 4,877,093 A | 10/1989 | Ford | | |
| 4,927,171 A * | 5/1990 | Westerlund | .......... | 280/124.174 |
| 5,788,263 A | 8/1998 | VanDenberg | | |
| 6,024,418 A * | 2/2000 | Ebert | ......................... | 301/130 |
| 6,039,336 A * | 3/2000 | Frey | .................... | 280/124.128 |
| 6,299,258 B1 * | 10/2001 | Wright et al. | ............ | 301/124.1 |
| 6,328,320 B1 * | 12/2001 | Walski et al. | ............ | 280/47.26 |
| 6,439,672 B1 * | 8/2002 | Simon | ..................... | 301/124.1 |
| 6,508,393 B2 | 1/2003 | Chalin | | |
| 6,827,360 B2 * | 12/2004 | Chan et al. | ............ | 280/124.116 |
| 2001/0027890 A1 * | 10/2001 | Bria et al. | .................... | 180/291 |
| 2003/0146592 A1 * | 8/2003 | Chalin et al. | .......... | 280/124.116 |

FOREIGN PATENT DOCUMENTS

| | | | | |
|---|---|---|---|---|
| JP | 357209402 A | * | 12/1982 | ............. 301/124.1 |
| JP | 360033102 A | * | 2/1985 | ............. 301/124.1 |

OTHER PUBLICATIONS

The Am. Heritage Dictionary of the English Language (4th ed. 2004).*
American Society for Testing and Materials Standard D-3878-02a, Dated Feb. 2003.

* cited by examiner

*Primary Examiner*—Jason R Bellinger
(74) *Attorney, Agent, or Firm*—Smith IP Services (57) ABSTRACT

A suspension system having an axle, at least a portion of which is made of a composite material. In a described embodiment, a suspension system includes an axle assembly which has a composite axle portion. Metal spindles are attached at each end of the axle for mounting wheels thereto. Two beams may be attached directly to the composite axle portion, to a sleeve overlying the composite axle portion, or to an axle seat attached to the sleeve or directly to the composite axle portion.

16 Claims, 8 Drawing Sheets

SUSPENSION SYSTEM HAVING A COMPOSITE AXLE

BACKGROUND

The present invention relates generally to vehicle suspension systems and, in an embodiment described herein, more particularly provides a suspension system having a composite axle.

It is increasingly important for truck and trailer suspension systems to be made lighter and have increased load-carrying capacities. This is due, in part, to increased fuel costs and other costs of transporting goods by wheeled vehicles. By making the vehicle lighter, less fuel is consumed. By increasing the load-carrying capacity, more cargo may be transported by an individual vehicle.

It is known to fabricate suspension system components out of laminated material to decrease the weight of the components. However, prior methods of constructing these components are seen to be unsatisfactory, since they are very time-consuming and labor-intensive. One example is described in U.S. Pat. No. 5,788,263 (the entire disclosure of which is incorporated herein by this reference).

From the foregoing, it can be seen that it would be quite desirable to provide improved methods of constructing suspension systems having reduced weight and increased load-carrying capacities.

SUMMARY

In carrying out the principles of the present invention, in accordance with an embodiment thereof, a suspension system is provided which includes an axle portion made of a composite material. Other portions of the suspension system, such as beams or arms for pivoting attachment of the axle to a vehicle frame, may also be made of composite material.

In one aspect of the invention, a suspension system is provided which includes an axle as part of an axle assembly. At least a portion of the axle is made of a composite material.

Beams may be attached to the composite axle portion in a variety of ways. For example, the beams may be made of metal, or the beams may be made of a composite material which wraps about the composite axle portion. A sleeve may be interconnected between each beam and the composite axle portion. An axle seat may be interconnected between each beam and the composite axle portion or, if the sleeve is used, an axle seat may be interconnected between each beam and each sleeve.

A spindle is attached at each end of the axle assembly. The composite axle portion may attach directly to each of the spindles. For example, the composite axle portion may be received within each of the spindles, or the spindles may be received within each end of the composite axle portion.

The beams may have a generally I-shaped or generally H-shaped cross-section. If the beams each include a portion made of a composite material, then another portion of each beam may be made of metal. The metal portion may include a pivot bushing sleeve. As another alternative, the composite beam portion may be wrapped about the pivot bushing sleeve.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1A:
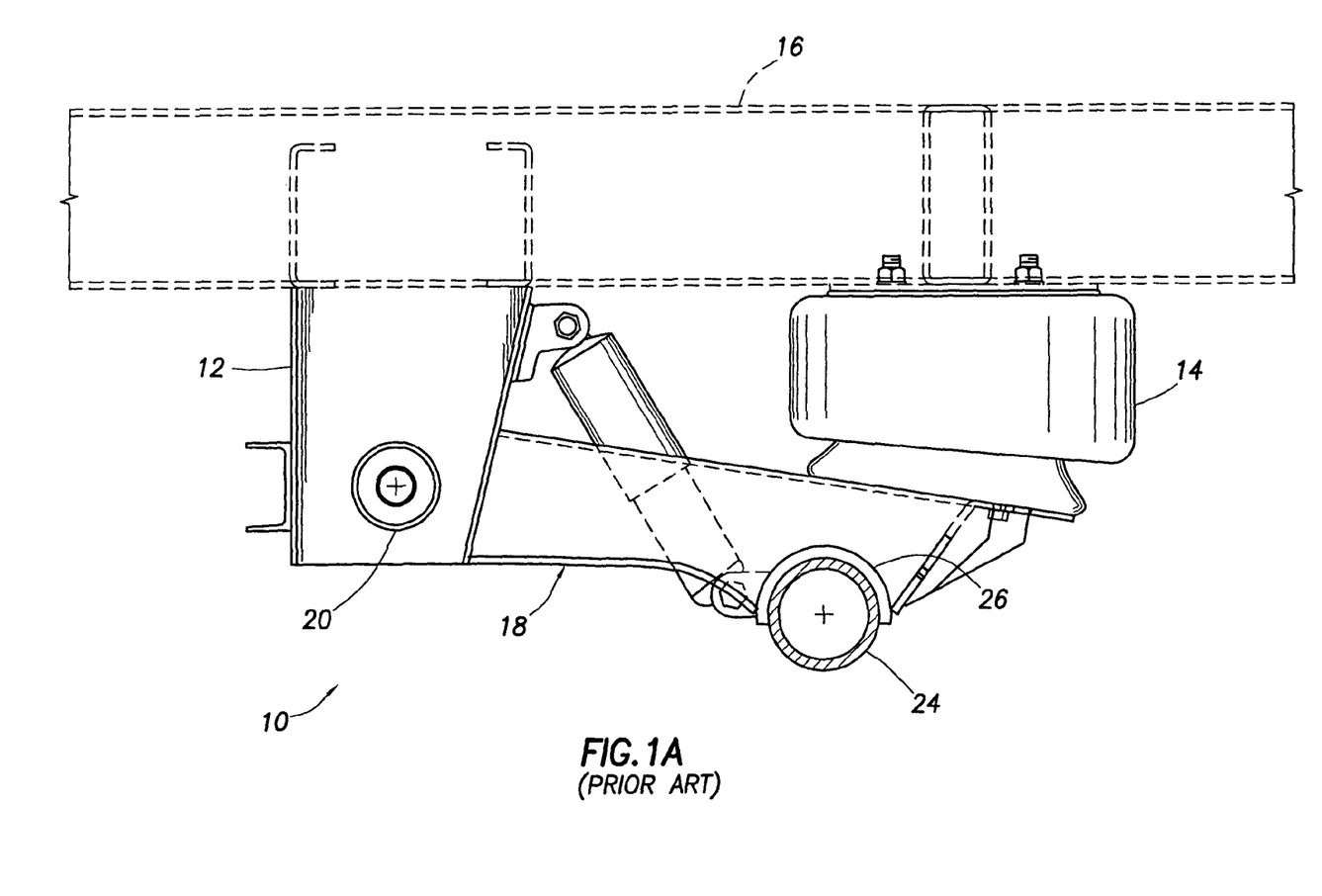
FIGS. 1A & B are side elevational views of prior art suspension systems.

Illustrated in FIG. 1A is a prior art suspension system 10 of the type described in U.S. Pat. No. 6,508,393, the entire disclosure of which is incorporated herein by this reference. The suspension system 10 (as well as the suspension system 22 shown in FIG. 1B) is described below for the purpose of demonstrating how the principles of the invention may be used in known types of suspension systems. However, it should be clearly understood that the principles of the invention may be used in any type of suspension system, for example, pusher-type suspension systems, trailing arm suspension systems, lift axle suspension systems, parallelogram and modified parallelogram suspension systems, spring beam suspension systems, steerable suspension systems, etc.

As depicted in FIG. 1A, the suspension system 10 includes a hanger bracket 12 extending downwardly from a frame 16 of a vehicle. An air spring 14 is connected between the frame 16 and a rear end of an arm or beam 18. A forward end of the beam 18 is pivotably connected to the hanger bracket 12 using a pivot bushing 20. An axle 24 is attached to the beam 18 by means of an axle seat 26 of the beam.

Figure 1B:
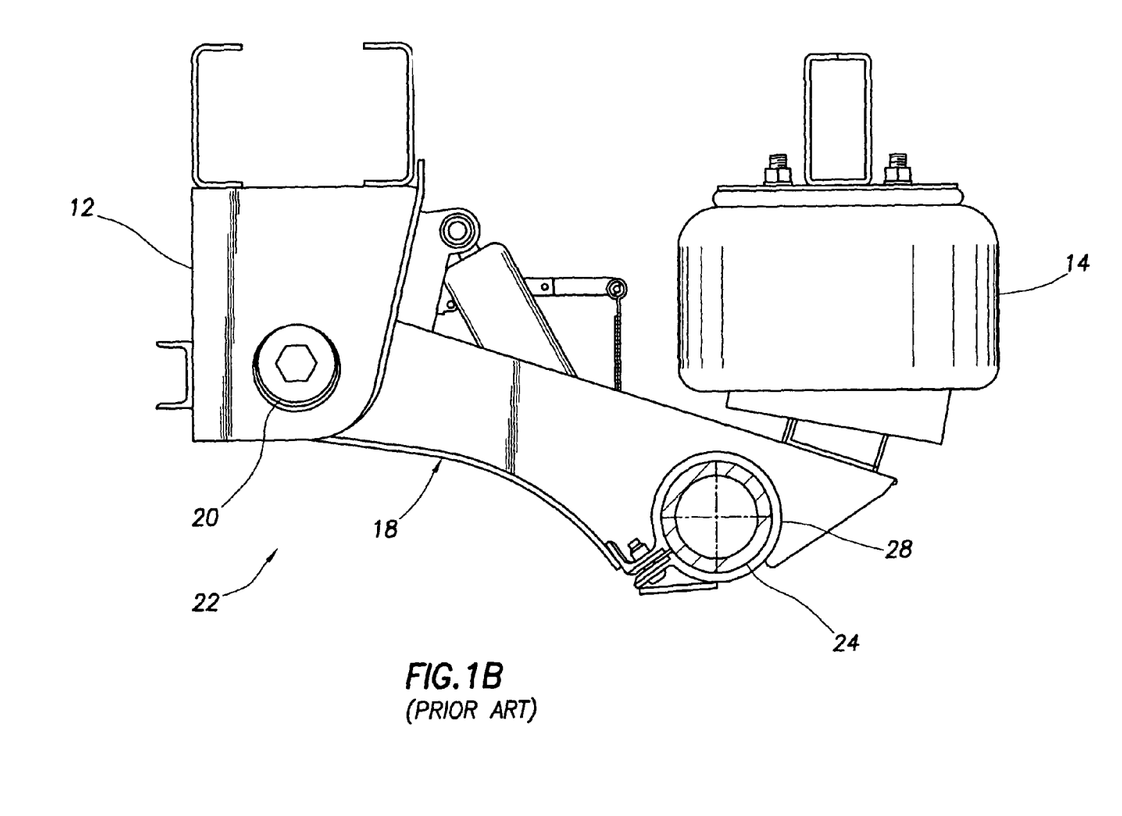

In FIG. 1B is illustrated another suspension system 22 which is similar in many respects to the suspension system 10 described above. Elements of the suspension system 22 which are similar to those described above are indicated in FIG. 1B using the same reference numbers. The suspension system 22 is of the type described in U.S. patent application Ser. No. 10/061,774, filed Feb. 1, 2002, the entire disclosure of which is incorporated herein by this reference.

The suspension system 22 differs in at least one substantial respect from the suspension system 10 in that the beam 18 is attached to the axle 24 using a sleeve 28 which is clamped to the axle. This clamping of the sleeve 28 to the axle 24 applies a compressive stress between the sleeve and axle, and removes clearance between the axle and sleeve. As a result, when the sleeve 28 is later welded to the axle 24, the welds are much stronger and have an increased fatigue strength.

Figure 2:
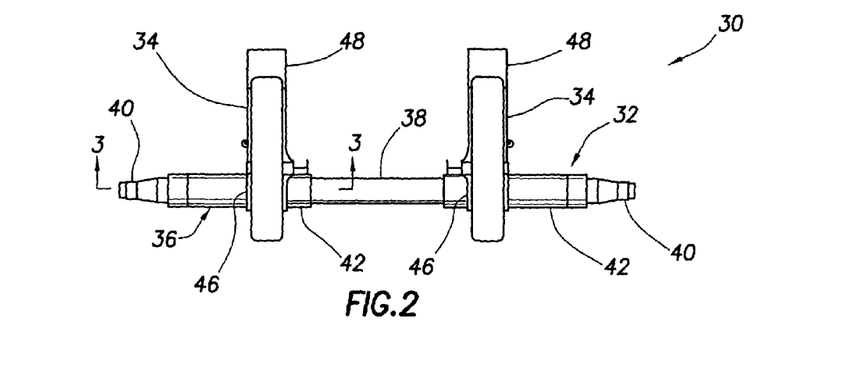
FIG. 2 is a top view of a first suspension system embodying principles of the present invention.

Representatively illustrated in FIG. 2 is a suspension system 30 which embodies principles of the present invention. In the following description of the suspension system 30 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

FIG. 2 depicts an axle assembly 32 with attached trailing arms or beams 34 apart from the remainder of the suspension system 30. The remainder of the suspension system 30 (hanger brackets, air springs, etc.) are similar to those in the suspension system 10 described above. For example, the beams 34 each include a metal pivot bushing sleeve 48 at a forward end thereof for pivoting attachment of the beams to the hanger brackets 12 via the pivot bushings 20. However, it should be clearly understood that the suspension system 30 may include components which are different from, or in addition to, those described above, and that the suspension system 30 may of a type other than that described above, without departing from the principles of the invention.

The axle assembly 32 includes an axle 36 having a portion 38 made of a composite material. As used herein, the term "composite material" is used to indicate a material consisting of two or more constituents, insoluble in one another, which are combined to form the material possessing certain properties not possessed by the individual constituents. Examples of composite materials include glass or carbon fibers in a resin matrix, etc.

The composite axle portion 38 is relatively light in weight as compared to conventional metal axles, yet possesses sufficient strength and toughness for the application. The composite axle portion 38 is generally tubular in shape with an annular cross-section, but other shapes may be used in keeping with the principles of the invention. Preferably, the composite axle portion 38 is made using a process known to those skilled in the art as "pultrusion," as opposed to a more costly and labor-intensive lamination process. However, it should be clearly understood that other processes, including laminating, molding, and laminations within a pultruded or molded element, may be used in keeping with the principles of the invention.

To facilitate attachment of the composite axle portion 38 to the metal beams 34 and to a metal wheel mounting spindle 40 at each end of the axle 36, a metal sleeve 42 is installed exteriorly about the composite axle portion and is bonded thereto, such as by using an appropriate adhesive. Note that the composite axle portion 38 extends completely through the sleeve 42 and into an interior of each of the spindles 40. The composite axle portion 38 may also be bonded to the spindles 40.

Figure 3:
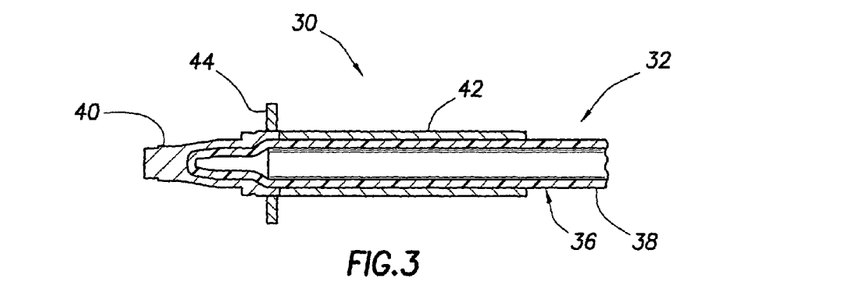
FIG. 3 is a cross-sectional view of the first suspension system, taken along line 3-3 of FIG. 2.

A cross-sectional view of an end of the axle 36 is depicted in FIG. 3. In this view it may be seen how the composite axle portion 38, sleeve 42 and spindle 40 are arranged relative to each other. As described above, the composite axle portion 38 is preferably adhesively bonded to the sleeve 42 and/or the spindle 40. The spindle 40 is preferably attached to the sleeve 42 by welding, such as friction welding, prior to bonding the composite axle portion 38 to the sleeve 42/spindle 40 assembly. However, other attachment or assembly methods may be used in keeping with the principles of the invention.

Another feature of the invention schematically shown in FIG. 3 is a brake mounting 44. The brake mounting 44 may be, for example, a brake spider of the type well known to those skilled in the art, or other type of brake mounting. Preferably, the brake mounting 44 is attached to the spindle 40 or sleeve 42 by welding, although other attachment methods may be used, if desired.

Figure 4:
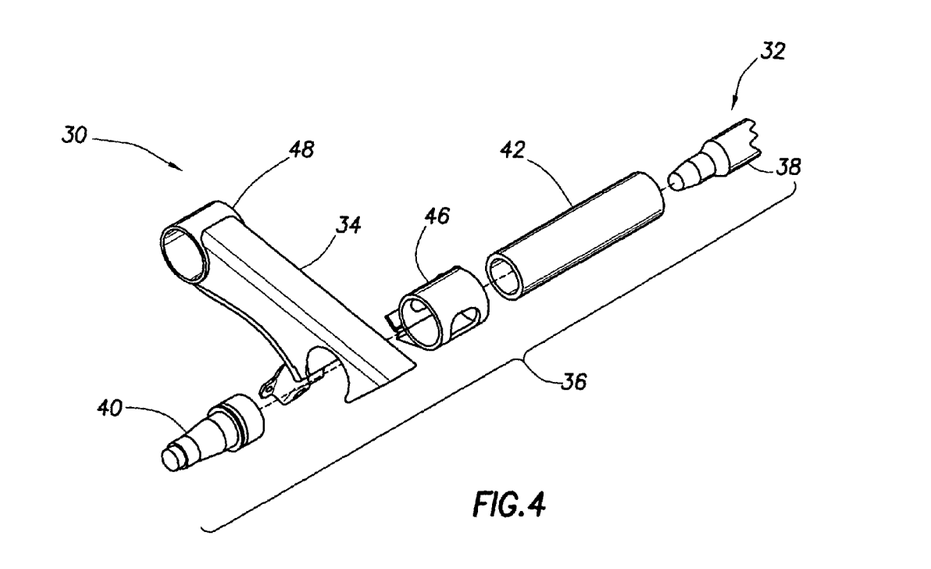
FIG. 4 is an exploded isometric view of a portion of the first suspension system.

An exploded isometric view of an end of the suspension system 30 is depicted in FIG. 4. In this view it may be seen how the beam 34 is attached to the axle assembly 32. A metal axle seat 46 is preferably clamped about, and welded to, the sleeve 42. The beam 34 is then welded to the axle seat 46.

However, it should be clearly understood that other methods of attaching the beams 34 to the axle assembly 32 may be used, in keeping with the principles of the invention. Various other methods of attaching beams to axle assemblies are described below, as well as other methods of constructing beams and axle assemblies. Any of these other methods may be used in the suspension system 30.

Figure 5:
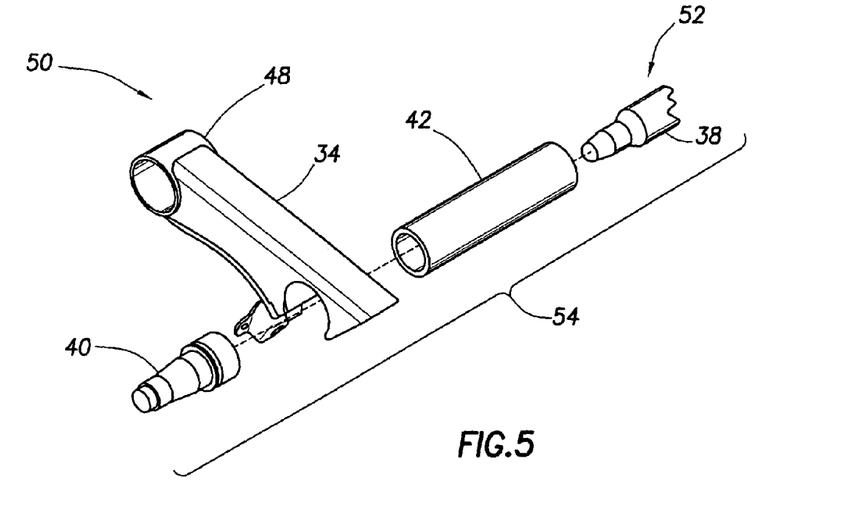
FIG. 5 is an exploded isometric view of a portion of a second suspension system embodying principles of the present invention.

Representatively illustrated in FIG. 5 is an exploded isometric view of an end of another suspension system 50 which includes an axle assembly 52. The suspension system 50 is very similar in many respects to the suspension system 30 described above, and so elements of the suspension system 50 which are similar to previously described elements are indicated in FIG. 5 using the same reference numbers.

One significant difference between the suspension system 50 and the suspension system 30 is the manner in which the beam 34 is attached to an axle 54 of the suspension system. Note that the suspension system 50 does not include the axle seats 46 described above. Instead, the beams 34 are attached directly to the sleeves 42, such as by welding.

The composite axle portion 38 still extends through the beams 38 and is received into the spindles 40 at each end of the axle assembly 52. However, different arrangements of these components may be used, if desired.

Figure 6:
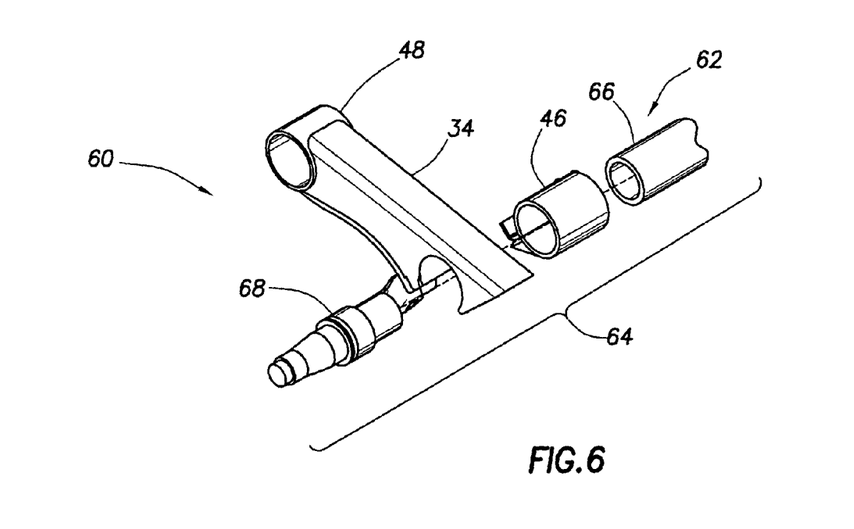
FIG. 6 is an exploded isometric view of a portion of a third suspension system embodying principles of the present invention.

Representatively illustrated in FIG. 6 is an exploded isometric view of an end of another suspension system 60 which includes an axle assembly 62. The suspension system 60 is very similar in many respects to the suspension systems 30, 50 described above, and so elements of the suspension system 60 which are similar to previously described elements are indicated in FIG. 6 using the same reference numbers.

One significant difference in the suspension system 60 is that the sleeve 42 is not used. Instead, the axle seats 46 are attached directly at each end of a composite axle portion 66, for example, by clamping and/or adhesively bonding. The axle seats 46 are then attached to the beams 34, for example, by welding.

Another significant difference in the suspension system 60 is that, instead of inserting the composite axle portion 66 into a spindle at each end of the axle 64, spindles 68 are used which are inserted into each end of the composite axle portion. The spindles 68 are attached to the composite axle portion 66, for example, by adhesively bonding, although other attachment methods may be used, if desired.

Figure 7:
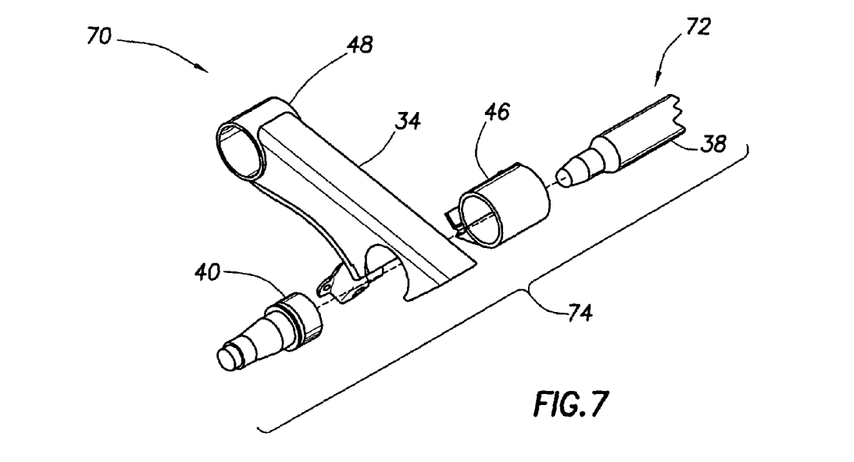
FIG. 7 is an exploded isometric view of a portion of a fourth suspension system embodying principles of the present invention.

Representatively illustrated in FIG. 7 is an exploded isometric view of an end of another suspension system 70 which includes an axle assembly 72. The suspension system 70 is very similar in many respects to the suspension systems 30, 50, 60 described above, and so elements of the suspension system 70 which are similar to previously described elements are indicated in FIG. 7 using the same reference numbers.

One significant difference in the suspension system 70 as compared to the suspension systems 30, 50 is that the sleeve 42 is not used. As in the suspension system 60 described above, the axle seat 46 is instead attached directly to the composite axle portion 38. The beam 34 is attached to the axle seat 46, for example, by welding. However, as compared to the suspension system 60, the suspension system 70 also differs by using the composite axle portion 38 which is inserted into, and attached to, the spindles 40 at each end of the axle 74.

Figure 8:
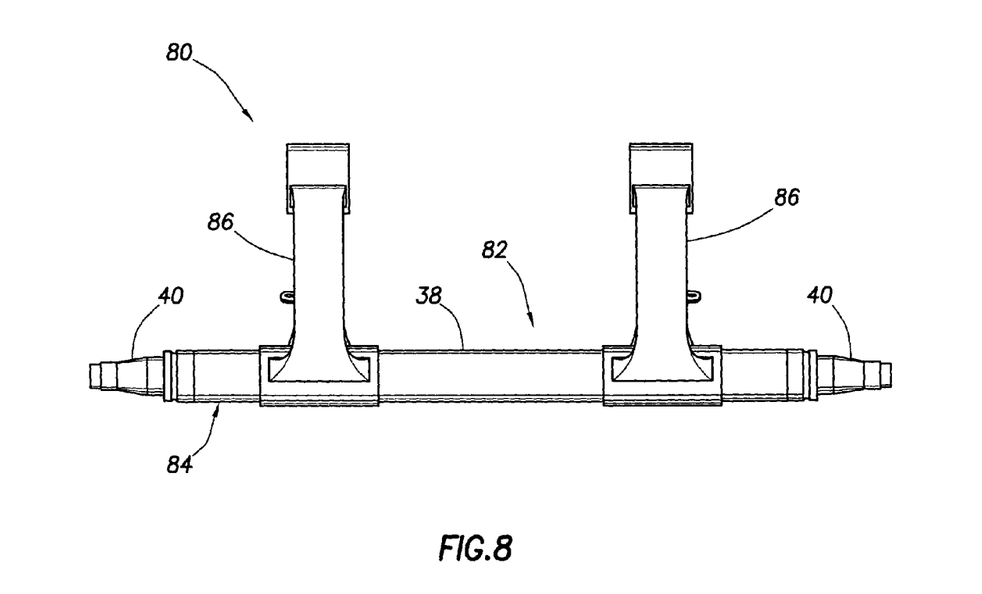
FIG. 8 is a top view of a fifth suspension system embodying principles of the present invention.
Figure 9:
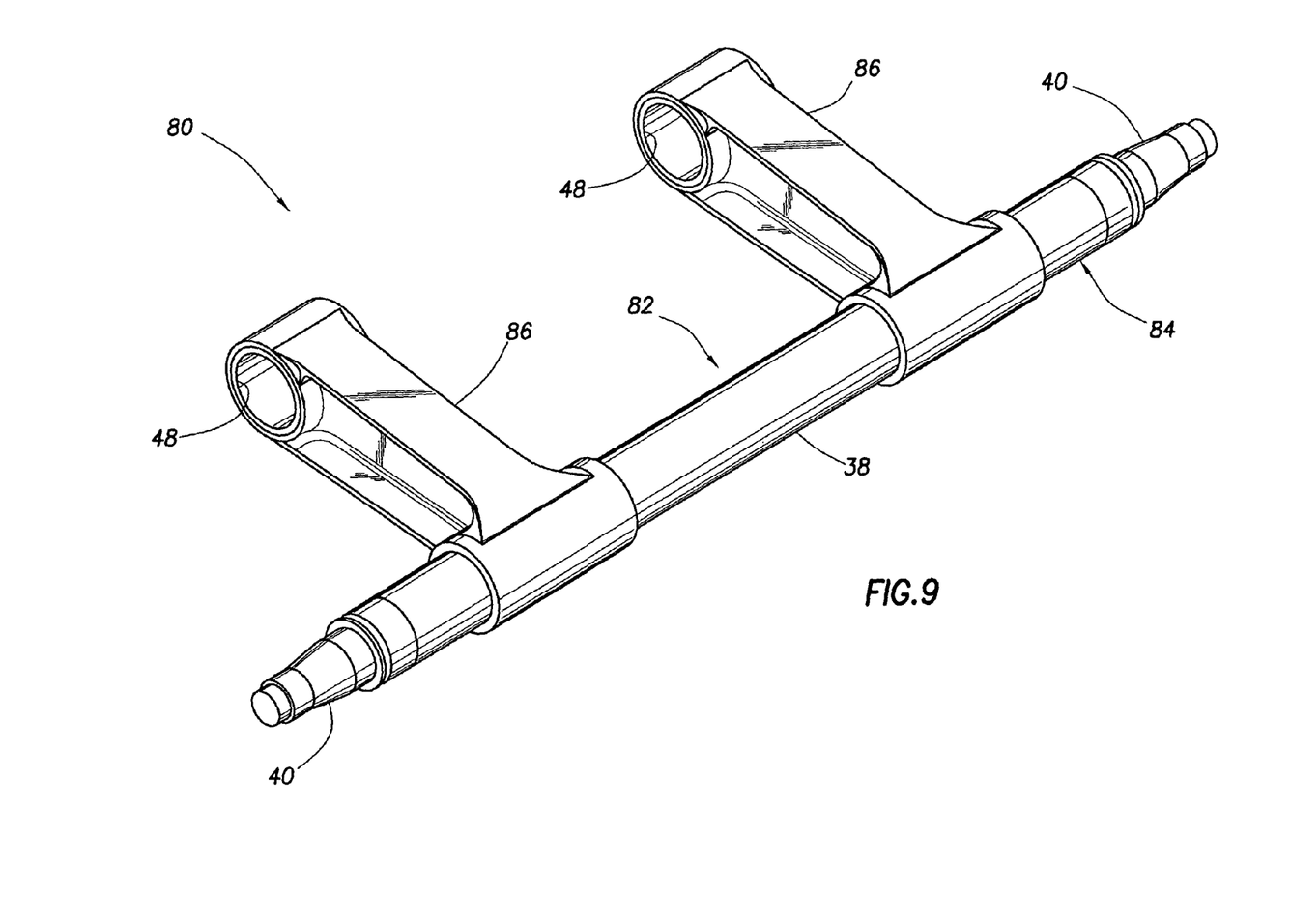
FIG. 9 is an isometric view of the fifth suspension system.

Representatively illustrated in FIGS. 8 and 9 is another suspension system 80 which includes an axle assembly 82. The suspension system 80 is similar in many respects to the suspension systems 30, 50, 60, 70 described above, and so elements of the suspension system 80 which are similar to previously described elements are indicated in FIGS. 8 and 9 using the same reference numbers.

The suspension system 80 differs from the previously described suspension systems 30, 50, 60, 70 in at least one substantial respect, in that it does not include the metal beams 34. Instead, the suspension system 80 includes beams 86 which are made of a composite material. In addition, the beams 86 each have a generally I-shaped cross-section, as may be seen from the isometric view in FIG. 9.

Preferably, the beams 86 wrap around the pivot bushing sleeves 48, so that the pivot bushing sleeves are surrounded by forward end portions of the beams. The beams 86 also preferably wrap around the composite axle portion 38, so that the composite axle portions are surrounded by rearward end portions of the beams. The beams 86 are preferably attached to the pivot bushing sleeves 48 and to the composite axle portion 38 by adhesively bonding the beams thereto, although other attachment methods may be used, if desired.

Figure 10:
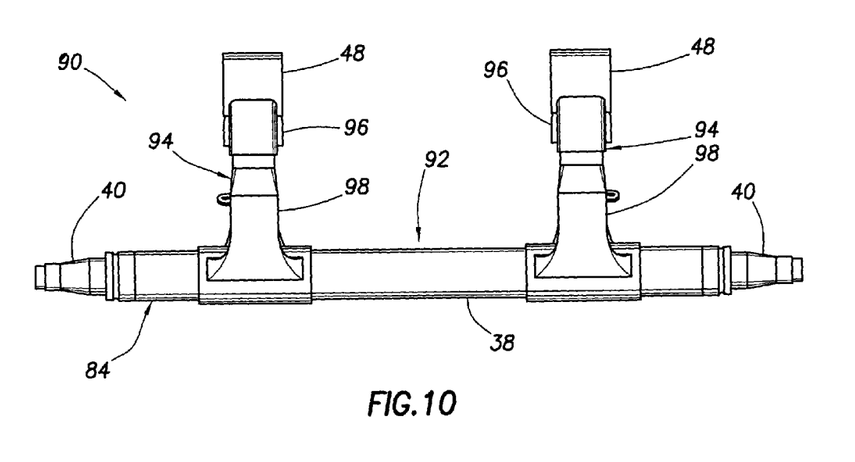
FIG. 10 is a top view of a sixth suspension system embodying principles of the present invention.
Figure 11:
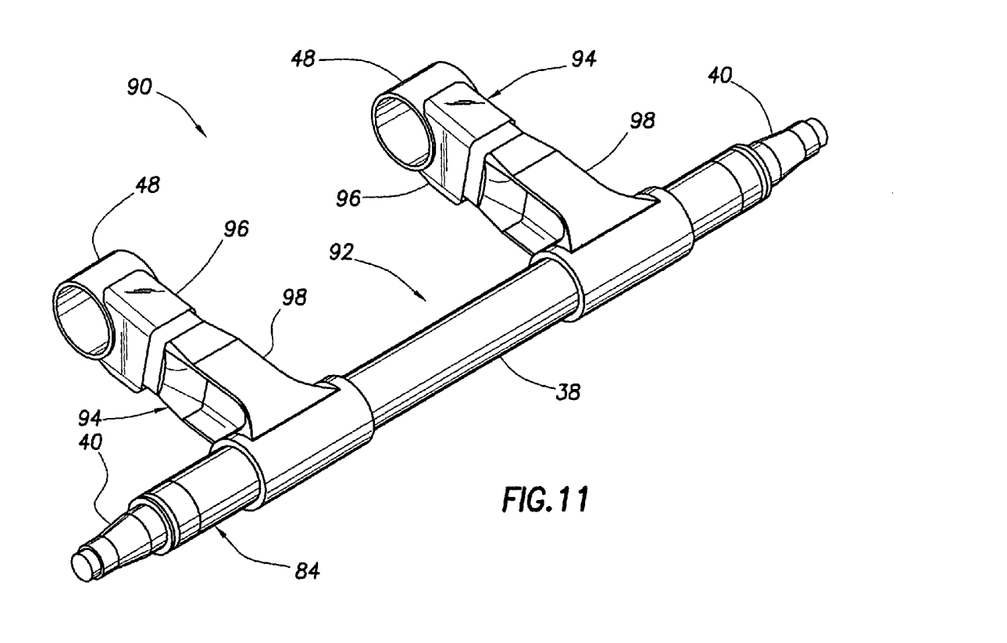
FIG. 11 is an isometric view of the sixth suspension system.

Representatively illustrated in FIGS. 10 and 11 is another suspension system 90 which includes an axle assembly 92. The suspension system 90 is similar in many respects to the suspension system 80 described above, and so elements of the suspension system 90 which are similar to previously described elements are indicated in FIGS. 10 and 11 using the same reference numbers.

The suspension system 90 differs from the previously described suspension system 80 in at least one substantial respect, in that it does not include the composite beams 86. Instead, the suspension system 90 includes beams 94 which each have a composite portion 98 and a metal portion 96. Preferably, the beam composite portions 98 are attached to the beam metal portions 96 by adhesive bonding, although other attachment methods may be used, if desired.

The beam metal portions 96 each include the pivot bushing sleeve 48. The pivot bushing sleeve 48 is preferably welded to the remainder of the beam metal portion 96, although other attachment methods may be used, if desired.

The beam composite portions 98 each have a generally I-shaped cross-section, similar to the beams 86 described above. Rearward end portions of the beam composite portions 98 are preferably wrapped about the composite axle portion 38 and are adhesively bonded thereto. The beam composite portions 98 are preferably attached to the beam metal portions 96 by inserting the composite portions into the metal portions and adhesively bonding, although other attachment methods may be used, if desired.

Figure 12:
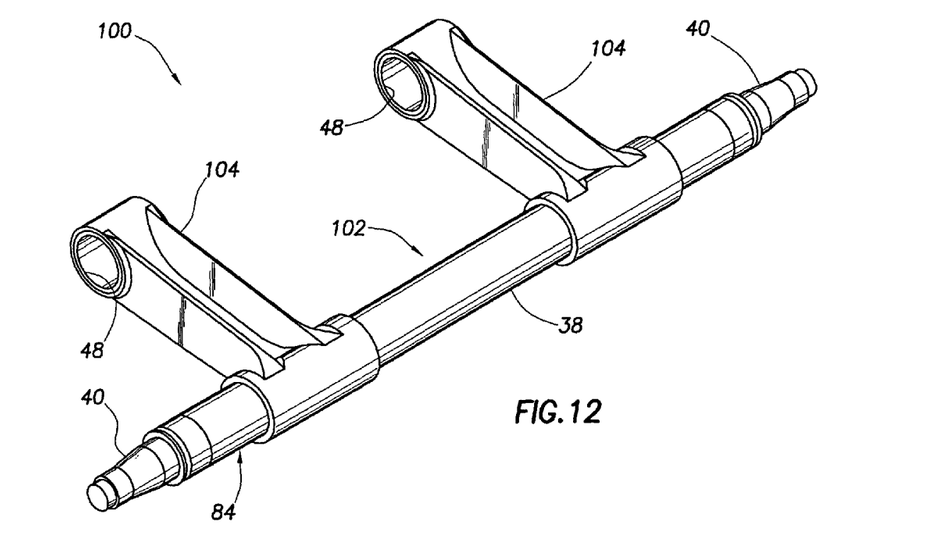
FIG. 12 is an isometric view of a seventh suspension system embodying principles of the present invention.

Representatively illustrated in FIG. 12 is another suspension system 100 which includes an axle assembly 102. The suspension system 100 is similar in many respects to the suspension system 80 described above, and so elements of the suspension system 100 which are similar to previously described elements are indicated in FIG. 12 using the same reference numbers.

The suspension system 100 differs from the previously described suspension system 80 in at least one substantial respect, in that it does not include the I-shaped cross-section beams 86. Instead, the suspension system 100 includes beams 104 which each have a generally H-shaped cross-section.

The beams 104 are made of a composite material. Forward end portions of the beams 104 are wrapped about and preferably adhesively bonded to the pivot bushing sleeves 48. Rearward end portions of the beams 104 are wrapped about and preferably adhesively bonded to the axle composite portion 38. Other attachment methods may be used, if desired.

Figure 13:
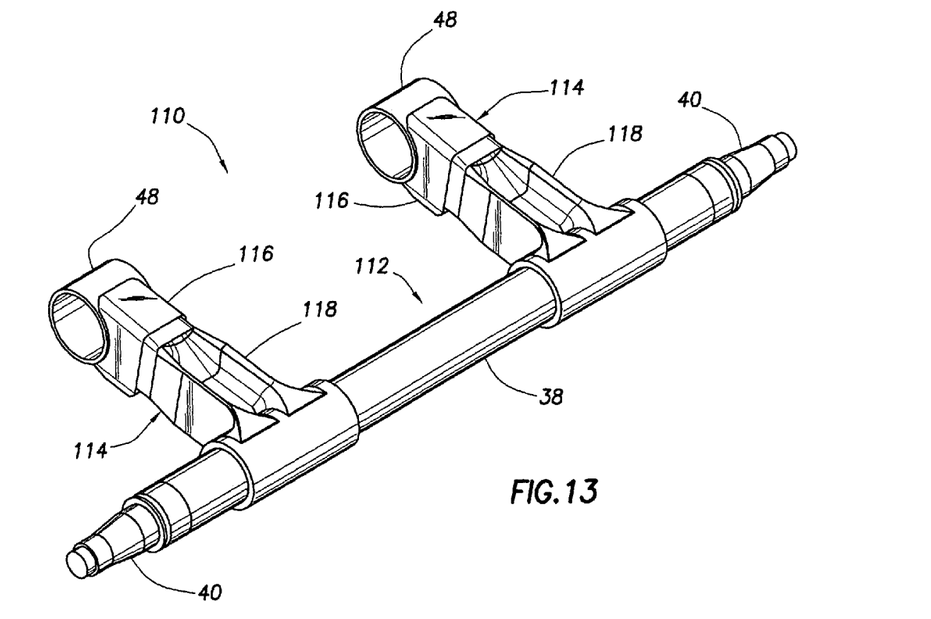
FIG. 13 is an isometric view of an eighth suspension system embodying principles of the present invention.

Representatively illustrated in FIG. 13 is another suspension system 110 which includes an axle assembly 112. The suspension system 110 is similar in many respects to the suspension systems 90 and 100 described above, and so elements of the suspension system 110 which are similar to previously described elements are indicated in FIG. 13 using the same reference numbers.

The suspension system 110 differs from the previously described suspension systems 90, 100 in at least one substantial respect, in that it does not include the composite beams 104 or the beams 94 having a metal portion 96 and an I-shaped cross-section composite portion 98. Instead, the suspension system 110 includes beams 114 which each have a composite portion 118 and a metal portion 116. Preferably, the beam composite portions 118 are attached to the beam metal portions 116 by adhesive bonding, although other attachment methods may be used, if desired.

The beam metal portions 116 each include the pivot bushing sleeve 48. The pivot bushing sleeve 48 is preferably welded to the remainder of the beam metal portion 116, although other attachment methods may be used, if desired.

The beam composite portions 118 each have a generally H-shaped cross-section, similar to the beams 104 described above, instead of the generally I-shaped cross-section beam portions 98 of the beams 94 described above. Rearward end portions of the beam composite portions 118 are preferably wrapped about the composite axle portion 38 and are bonded thereto. The beam composite portions 118 are preferably attached to the beam metal portions 116 by inserting the composite portions into the metal portions and adhesively bonding, although other attachment methods may be used, if desired.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. For example, although certain materials, such as metal or composite, may have been specified for certain elements of these embodiments, any of the composite materials may be substituted for any of the metal materials, and vice versa. Metal materials may be any metal or metal alloy, such as steel, aluminum, etc. Accordingly, the foregoing detailed description is to be clearly understood as being given by way of illustration and example only, the spirit and scope of the present invention being limited solely by the appended claims and their equivalents.

What is claimed is:

1. A suspension system, comprising:
   an axle assembly including an axle, at least a portion of the axle being made of a composite material;
   at least two beams attached to the axle, thereby preventing rotation of the axle relative to the beams, the beams pivoting relative to a vehicle frame; and at least two metal sleeves secured exteriorly about the axle composite portion.

2. The suspension system according to claim 1, wherein each of the beams is attached to a respective one of the sleeves.

3. The suspension system according to claim 1, wherein each of the sleeves is bonded to the axle composite portion.

4. The suspension system according to claim 1, wherein each of the beams is welded to a respective one of the sleeves.

5. The suspension system according to claim 1, wherein the axle composite portion extends through each of the sleeves.

6. The suspension system according to claim 1, further comprising at least two axle seats, each of the axle seats being interconnected between a respective one of the sleeves and a respective one of the beams.

7. The suspension system according to claim 1, further comprising at least two spindles, each of the spindles being attached to a respective one of the sleeves.

8. The suspension system according to claim 7, wherein the axle composite portion extends into each of the spindles.

9. The suspension system according to claim 7, wherein each of the spindles is bonded to the axle composite portion.

10. A suspension system, comprising:
an axle assembly including a composite axle portion and a spindle attached to the composite axle portion, the spindle being configured to permit rotation of a wheel relative to the axle; and
at least two beams attached to the axle assembly, the beams pivoting relative to a vehicle frame,
wherein the spindle is attached to a sleeve at least partially overlying the composite axle portion.

11. The suspension system according to claim 10, wherein the spindle is welded to the sleeve.

12. The suspension system according to claim 10, further comprising an axle seat attached to the sleeve.

13. The suspension system according to claim 12, wherein the axle seat is interconnected between the sleeve and one of the beams.

14. The suspension system according to claim 13, wherein the axle seat is welded to each of the sleeve and the one of the beams.

15. A suspension system, comprising:
an axle assembly including a composite axle portion and a spindle attached to the composite axle portion, the spindle being configured to permit rotation of a wheel relative to the axle; and
at least two beams attached to the axle assembly, the beams pivoting relative to a vehicle frame,
wherein the composite axle portion is received within an interior of the spindle.

16. A suspension system, comprising:
an axle assembly including a composite axle portion and a spindle attached to the composite axle portion, the spindle being configured to permit rotation of a wheel relative to the axle; and
at least two beams attached to the axle assembly, the beams pivoting relative to a vehicle frame,
wherein the spindle is bonded to the composite axle portion.

* * * * *